United States Patent [19]

Arditty et al.

[11] Patent Number: 5,056,919
[45] Date of Patent: Oct. 15, 1991

[54] DEVICE FOR MEASURING A PHASE SHIFT WHICH IS NOT RECIPROCAL PRODUCED IN A RING INTERFEROMETER

[75] Inventors: Hervé J. Arditty; Claude Puech; Michel Papuchon, all of Paris, France

[73] Assignee: Thomson CSF, Paris, France

[21] Appl. No.: 313,939

[22] Filed: Oct. 6, 1981

[30] Foreign Application Priority Data

Nov. 7, 1980 [FR] France .................................. 80 23878

[51] Int. Cl.[5] .............................................. G01B 9/02
[52] U.S. Cl. ........................................ 356/350; 356/349
[58] Field of Search ............... 356/346, 350, 359, 360, 356/349; 372/94

[56] References Cited

U.S. PATENT DOCUMENTS

| 3,512,890 | 5/1970 | McLaughlin | 356/350 |
| 3,743,969 | 7/1973 | Hutchings | 356/350 |
| 4,265,541 | 5/1981 | Leclerc et al. | 356/350 |
| 4,352,563 | 10/1982 | McLandrich | 356/350 |

FOREIGN PATENT DOCUMENTS

2271542 12/1975 France .
2409518 6/1979 France .

Primary Examiner—Stephen C. Buczinski
Attorney, Agent, or Firm—Cushman, Darby & Cushman

[57] ABSTRACT

A ring-shaped interferometer device containing optical means for phase shifting which act on the rays passing through the rings, these means containing an oscillator which delivers a periodic voltage of frequency $\frac{1}{2}\tau$, in which $\tau$ is the time taken by a ray to pass through the ring and a saw-tooth generator whose resonant frequency is slaved to the non reciprocal phase shift.

13 Claims, 8 Drawing Sheets

DEVICE FOR MEASURING A PHASE SHIFT WHICH IS NOT RECIPROCAL PRODUCED IN A RING INTERFEROMETER

BACKGROUND OF THE INVENTION

The present invention relates to a device for measuring a phase shift, which is not reciprocal, produced in an optical, ring-shaped interferometer.

Such an interferometer contains mainly a luminous energy source, generally formed by a laser, an optical device forming a wave-guide consisting either of a certain number of mirrors or of an optical fibre wound around itself, a device for separating and mixing the light and a device for detecting and processing the signal detected. Two waves coming from the separator device pass through the optical device forming the wave-guide in opposite directions.

A fundamental property of ring-shaped interferometers is their reciprocity, any disturbance with the optical path affects both waves in the same way.

However, there are two types of disturbances which affect this reciprocity. On the one hand, there are disturbances which vary within a length of time comparable to the propagation time of the waves along the interferometer optical path and, on the other, there are disturbances, called "non reciprocal", which have a different effect on the waves depending on the direction in which they move along the optical path.

Certain physical effects destroy the symmetry of the medium in which the waves propagate. In particular, there are the Faraday effect, or colinear magneto-optical effect, by which a magnetic field produces a preferential orientation in the spin of electrons in an optical material, this effect being used in the making of current measuring devices, and the Sagnac effect, or relative inertia effect, in which the rotation of the interferometer with respect to a Galilean ratio destroys the propagation time symmetry. This effect is used to produce gyrometers.

In the absence of disturbances which are not reciprocal, the phase difference $\Delta\Phi$ between the two waves, which recombine in the separator and mixer device after passing through the optical path, is zero. The detection and processing device picks up signals representing the optical power of the compound wave obtained after recombination. If it is required to measure small amplitude disturbances, small rotation speeds in the case of gyrometers for example, the component due to the appearance of reciprocal disturbances varies little because the phase shift $\Delta\Phi$ is almost zero. It is then necessary to introduce, artificially, an additional fixed phase shift or "non reciprocal bias" to increase the measurement sensitivity. However, this procedure meets with difficulties in its application, especially as far as stability is concerned the instability of the devices of prior practice is, in general, of the same order of size as the variations in the quantity to be measured. Methods designed to obtain greater stability in these devices have been suggested but the improvement in measurement sensitivity is less than that hoped for; the maximum theoretical sensitivity is determined by calculations of the limit due to quantum noise.

SUMMARY OF THE INVENTION

To palliate these disadvantages, the invention offers a method which enables the operating point of a ring-shaped interferometer to be moved. This method then allows an improvement in the sensitivity of measurement of a physical quantity which introduces small amplitude disturbances, which are not reciprocal. Also, it does not need great stability in the phenomena concerned.

The application of this procedure is especially convenient in interferometers with a very long path, an optical fibre for example, which are used for measuring rotation rates or electric currents. Also, the invention offers, with respect to other methods of prior practice, the following advantages : drift in the electronic part of the equipment does not limit stability in the measurement, the method makes it possible to work at the point of maximum sensitivity, the zero method used makes the interferometer sinusoidal response linear and the output signal frequency is proportional to the amplitude of the phase shift to be measured : its integration is done by counting without drift.

The invention provides then an optical interferometer device intended to measure a phase shift, which is not reciprocal, suffered by two radiations moving in opposite directions in a ring-shaped wave-guide, this device containing a monochromatic luminous source, means for photodetection of the interference in these radiation and optical separator and mixer means which connect the ends of this wave-guide to the luminous source and photodetection means; said device containing electrically controlled means for giving an optical phase shift $\phi$, which acts on these radiations, an oscillator which delivers a periodical voltage of $\frac{1}{2}\tau$, in which $\tau$ is the time taken by each of the radiations to pass through the path fixed by the ring, a saw-tooth wave generator with an adjustable slope, a synchronous detector which receives this periodic voltage at one of its inputs and is connected at its other one to the photodetector means, the output of this synchronous detector is connected to the slope control input of the saw-tooth wave generator, the phase sweep produced by this saw-tooth wave is roughly $2\pi$, the resonant frequency of this saw-tooth wave is slaved to the non reciprocal phase shift, the periodic voltage and saw-tooth voltage are superimposed at the input of these phase-shift means.

DESCRIPTION OF THE DRAWINGS

The invention will be better understood and other advantages will appear from the description which follows and the figures attached.

DESCRIPTION OF THE PREFERED EMBODIMENTS

Figure 1:
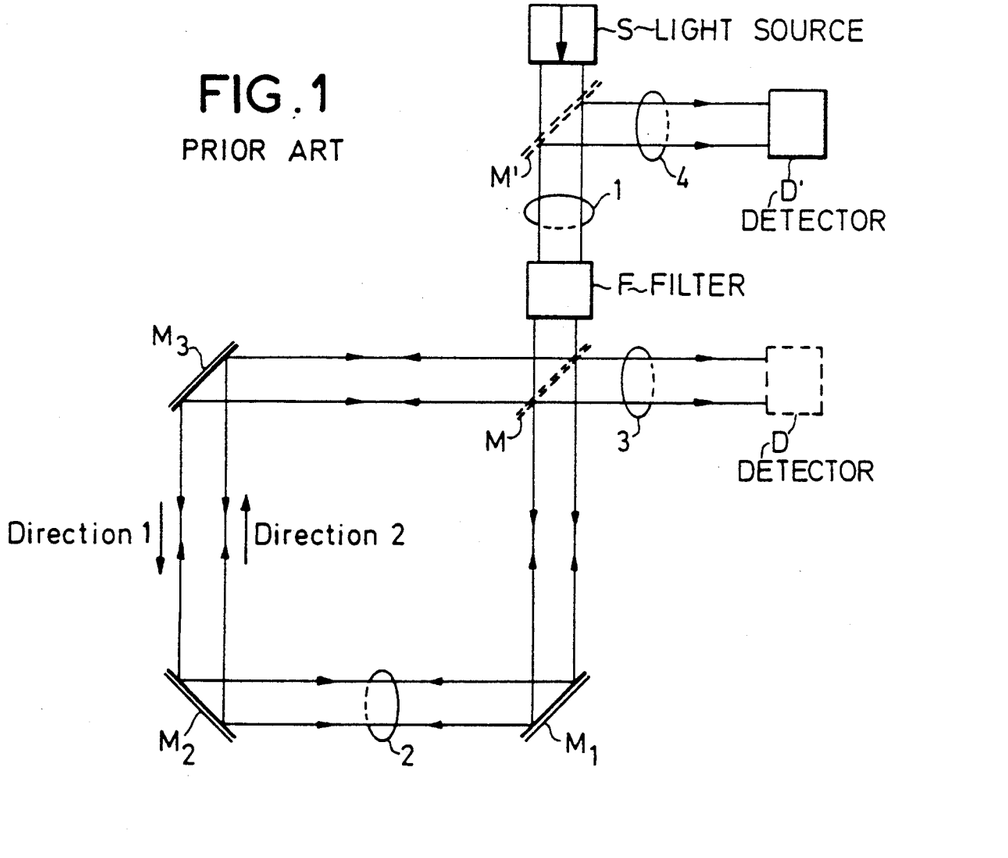
FIG. 1 shows schematically a ring-shaped interferometer.

FIG. 1 shows schematically a ring-shaped interferometer of prior practice. A laser source S sends a beam of parallel rays 1 to a separator device formed by a semitransparent sheet M.

A certain number of mirrors $M_1$, $M_2$, $M_3$ determine an optical path which forms the ring of the interferometer. This ring may be produced by means of a monomode optical fibre for example; measurement sensitivity is increased by the use of a long optical path. This ring is looped on the separator device M which also acts as a mixer device and thus determines an output branch 3. Hence, the ring contains two waves propagating in opposite directions, one clockwise (direction 2) and the other anticlockwise (direction 1). These two waves recombine at separator sheet M. The result of this combination can be seen in output branch 3 by means of detector D. A part of the beams is picked up again in the input arm by separator sheet M and passes through filter device F. At the output the two waves recombine at separator sheet M'. The result of this combination can be seen in output branch 4 by means of detector D'. When branch 4 is considered, the insertion of filter device F in the interferometer input arm makes it strictly reciprocal. It is then passed through by a wave in a single optical mode. This filter device consists of a mode filter followed by a polarizer. Incident beam 1 passes through this filter and the fraction which comes out is in a single mode. Hence two things may be considered; either the emerging beam 3 corresponding to the interference of the two beams which have not passed through the mode filter device again, or the part of the beams which is picked up again in the input arm by the semi-transparent sheet M. This part of the beams passes through filter device F again. At its output, the two beams passed in arm 4 by means of semi-transparent sheet M' are in the same mode, which makes the interferometer insensitive to "reciprocal" disturbances.

Let $\Delta\phi$ be the phase difference between the two waves propagating in opposite directions in the ring and $P_S$ the optical power output that can be measured in output branch 4. In the absence of "non reciprocal" disturbance $\Delta\phi$ is zero.

As a non-limiting example, a gyrometer using a ring-shaped interferometer may be considered. A "non reciprocal" disturbance will be produced by the rotation of the gyrometer. The phase difference $\Delta\phi$ is not zero and $\Delta\phi = \alpha\Omega$ in which $\Omega$ is rotational speed and $$\alpha = k\frac{L}{\lambda C}$$

in which k is a constant depending on the gyrometer geometry, L the length of the optical path, $\lambda$ the wavelength of the light emitted by laser source S and C the light speed in ring 2. When the rotational speed $\Omega$ increases, the phase difference $\Delta\phi$ increases in the same proportion because coefficient $\alpha$ remains constant. The optical power $P_S$ changes in accordance with a cosine law.

$$P_S = P_{1S} + P_{2S} + 2\sqrt{P_{1S}P_{2S}}\cos(\Delta\phi)$$

in which $P_{1S}$ corresponds to direction 1 and $P_{2S}$ to direction 2. The measurement sensitivity for a given value $\Delta\phi$ is given by the derivative of $P_S$.

$$\frac{dP_S}{d(\Delta\phi)} = -2\sqrt{P_{1S}P_{2S}}\sin(\Delta\phi)$$

The interferometer sensitivity is very low if the phase difference $\Delta\phi$ is almost zero. This is the case in gyrometer when small rotational speeds are to be measured. The optical power variation in the output branch is shown by the diagram in FIG. 2.

Figure 2:
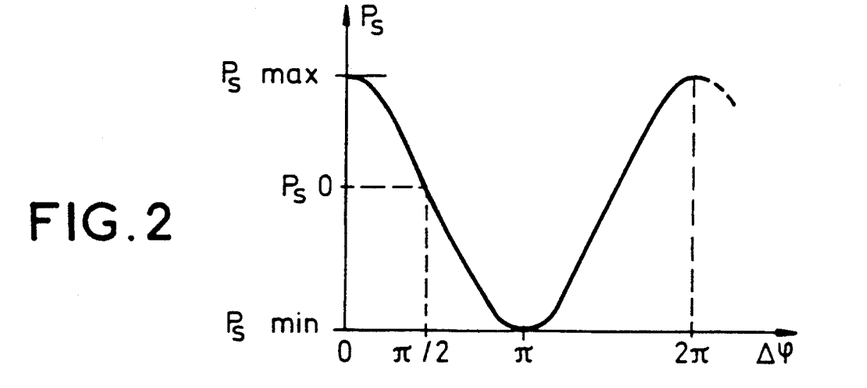
FIG. 2 is a diagram showing a special aspect of the ring-shaped interferometer.

The terms $P_{1S}$ and $P_{2S}$ may be considered equal. It follows then that, for a phase difference $\Delta\phi = \pi$, the power detected is a minimum. It passes through a maximum $P_{Smax}$ when $\Delta\phi = 0$ and $2\pi$ and so on.

To increase the interferometer sensitivity a constant "non reciprocal" bias can be added to the phase of the two waves moving in opposite directions to move the interferometer operating point.

In the case of a function which varies in accordance with a cosine function, the highest sensitivity point is obtained for the angles $(2K+1)\pi/2$ in which K is a whole number. A bias can then be chosen which adds to each wave a phase variation in absolute values of $\pi/4$ but of opposite signs. In the absence of "non reciprocal" interference, the phase difference then becomes $\Delta\phi' = \Delta\phi + \Delta\phi_0$ in which $\Delta\phi_0 = \pi/2$. This is at point $P_{So}$ on FIG. 2.

Figure 3:
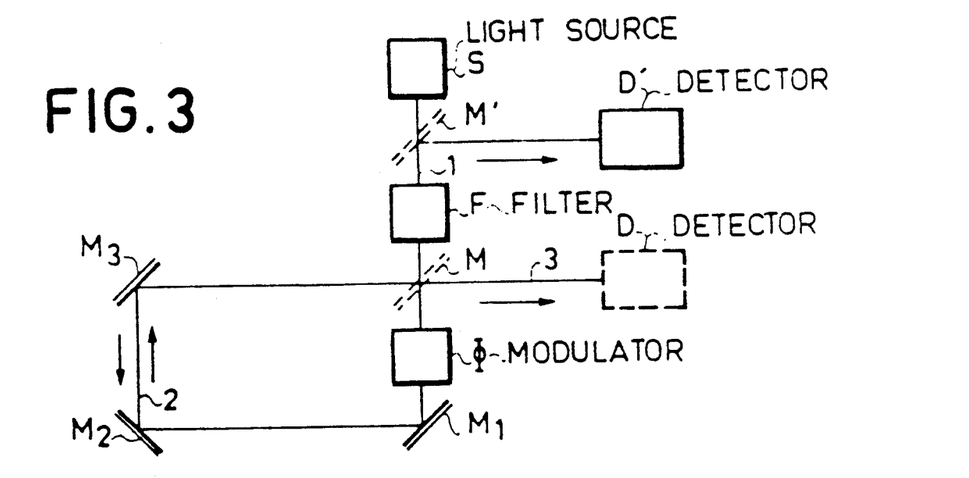
FIG. 3 shows schematically an improvement in prior practice added to the ring-shaped interferometer.

As shown in FIG. 3, a phase modulator can be added on the wave path in ring 2 which produces a reciprocal effect. This modulator is so energized as to produce a phase variation in the wave which passes through it. This variation is periodic, its period being equal to $2\tau$ in which $\tau$ is the time taken by a wave in the ring.

The phase difference then becomes $\Delta\phi' = \Delta\phi + \phi(t) - \phi(t-\tau)$ in which each of the waves circulating in the opposite direction suffers this phase shift when it passes through the modulator with $\phi(t) = \phi(t+2\tau)$.

Figure 4:
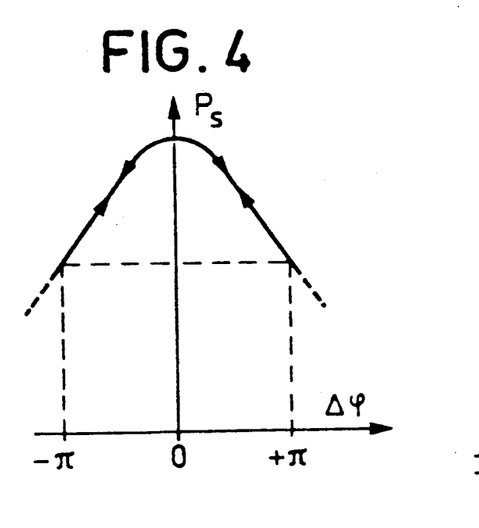
FIGS. 4, 5, 6 and 7 are diagrams showing this improvement.
Figure 5:
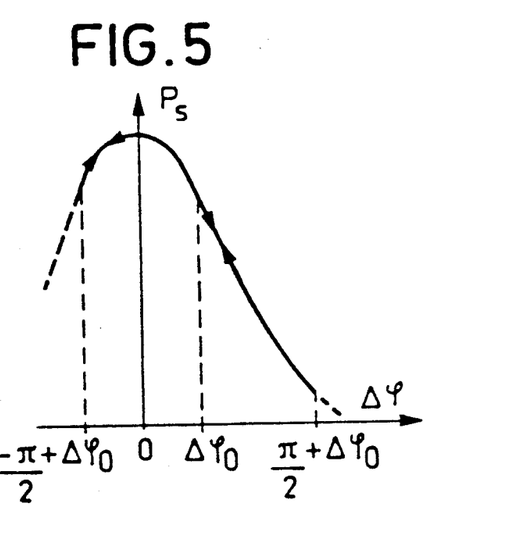

FIGS. 4 and 5 show the effect of phase modulation by a symmetrical function $\phi(t)$. The operating point describes the curve $P_S = f(\Delta\phi)$ in FIG. 2 symmetrically between a pair of extreme points. The first pair, on FIG. 4, shows the case in which the rotation to be measured is zero; it is reduced to the two values $-\pi/2$ and $+\pi/2$. The second pair, on FIG. 4, shows the case in which the speed to be measured is no longer zero and it is given by a value $\Delta\phi_0$ of phase difference; it is represented by the values $(-\pi/2 + \Delta\phi_0)$ and $(+\pi/2 + \Delta\phi_0)$.

To obtain this, a reciprocal phase shift $\phi(t)$ of rectangular shape can be applied to one end of the optical path.

Figure 6:
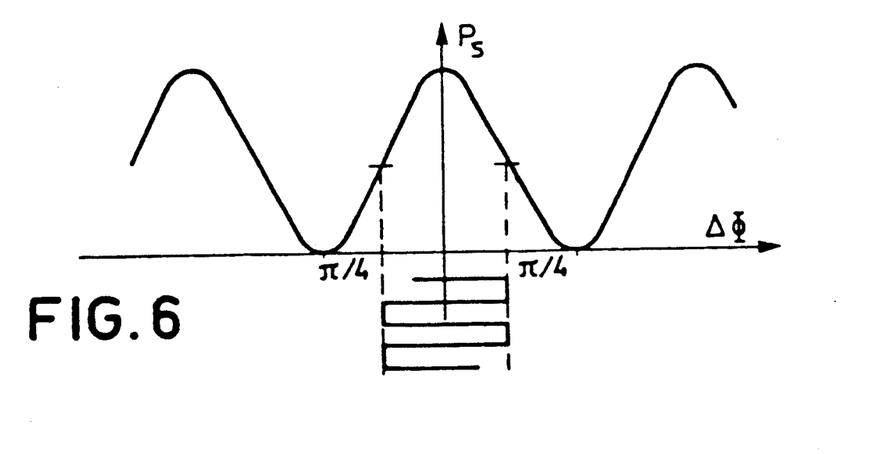
Figure 7:
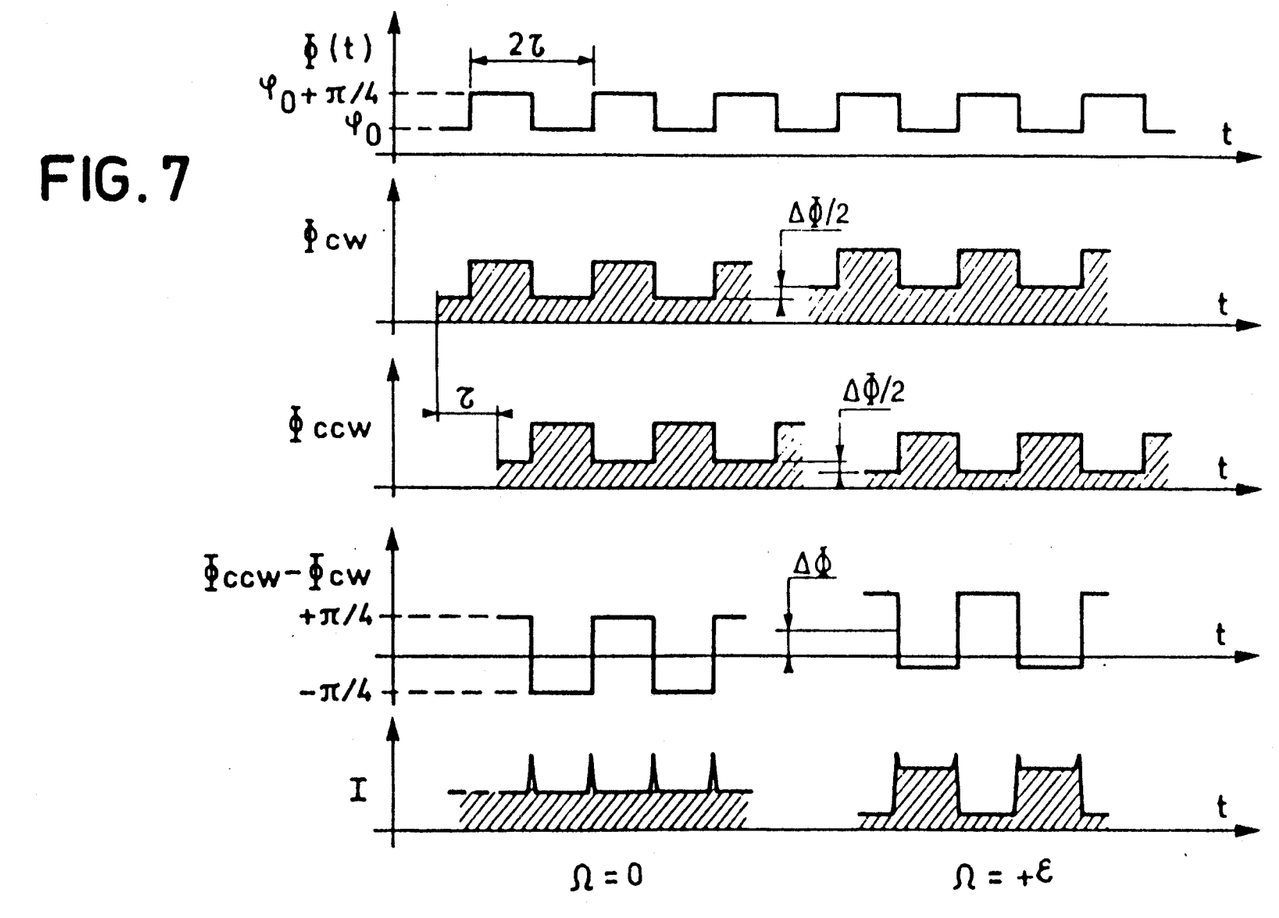

As shown in FIG. 7, the signal varies between two values, $\phi_0$ and $\phi_0 + \pi/2$. If the case of FIG. 4 is considered, i.e. when $\Omega = 0$, because of the introduction of $\phi(t)$, to the signal already detected will be added a component $\phi(t) - \phi(t-\tau)$ in which $\phi_{CW}$ and $\phi_{CCW}$ are the phase shifts resulting to the two waves which interfere with each other as shown in FIGS. 6 and 7 (left hand side). The phase shift between $\phi_{CW}$ and $\phi_{CCW}$ is then a purely reciprocal one. $\phi_{CCW} - \phi_{CW}$ is a rectangular signal varying between $+\pi/2$ and $-\pi/2$.

On the other hand, if the case of FIG. 5 is considered, i.e. when $\Omega = \epsilon$, to the signal already detected, because of the introduction of $\phi(t)$, will be added a component $\phi'_{CCW} - \phi'_{CW}$ which is no longer centred with respect to 0. This is because a non reciprocal phase shift $\Delta\phi$ is added to the preceding reciprocal phase shift. Compared with the preceding case in which $\Omega = 0$, this gives $\phi'(t)=\phi(t)+\Delta\phi/2$ and $\phi'(t-\tau)=\phi'(t)-\Delta\phi/2$. This gives $\phi'(t)-\phi'(t-\tau)=\phi(t)-\phi(t-\tau)+\Delta\phi:\phi_{CW}$ and $\phi_{CCW}$ are the phase shifts resulting to each of the two waves which pass through the ring in opposite directions. Hence, $\phi_{CCW}-\phi_{CW}$ is a rectangular signal whose mean value is offset by $\Delta\phi$ with respect to the time axis.

Figure 8:
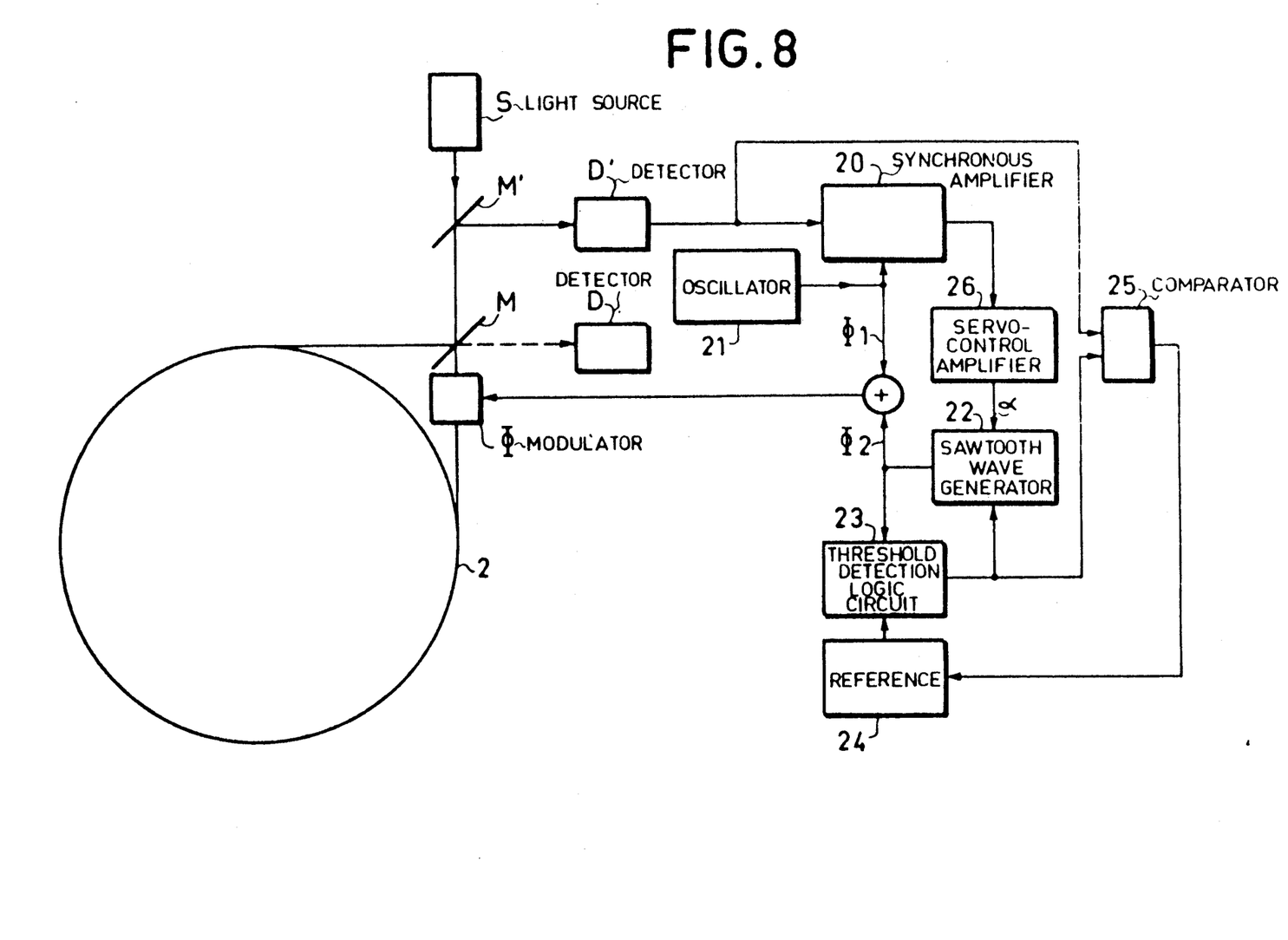
FIG. 8 show schematically a device using the method in the invention.

FIG. 8 shows a way of making the interferometer in accordance with the invention, phase modulators being provided along the path of the ring in this interferometer so that the speed measurement may be more precise. In FIG. 8, there is a Sagnac interferometer with its ring 2 and the production of a phase modulation signal $\phi(t)$. The phase modulator is inserted in ring 2. The signal coming from detector D' is passed to a synchronous amplifier piloted by an oscillator of frequency $\frac{1}{2}\tau$ which delivers a periodic signal $\phi_1(t)$. For the rest of the text, the detector+synchronous amplifier assembly will be called a synchronous detector. The signal coming from this synchronous detector feeds the control of the slope $\alpha$ in saw-tooth wave generator 22 through a servo-control amplifier 26 of the P.I.D. type. This saw-tooth wave generator has its output $\phi_2$ combined with that $\phi_1$ of oscillator 21 to feed phase modulator $\phi$. A threshold detection logic circuit 23 causes the saw-tooth wave to drop down. This detection is done with respect to a reference which may be a voltage, Vref for example. This reference can be regulated. The signal is of the form $\cos^2$. It must therefore remain the same before and after the saw-tooth drop. Hence, comparison of the reference signals, voltages for example, at these two instants enables reference 24 to be regulated by means of comparator 25.

The measurement made at the detector corresponds to a current:

$$I_1 = I_{1o} \cos^2(\Delta\phi/2).$$

If $\Delta\phi$ is the non reciprocal phase shift undergone by the light passing through the interferometer, the electrical signal in the detector, which is proportional to the optical intensity detected, will be: $I \propto \cos^2(\Delta\phi/2)$. The sensitivity of this measurement, $dI/d\Delta\phi$, is a maximum when $\Delta\phi \approx (2k+1)\pi/4$ and zero when $\Delta\phi \approx K\pi$, especially around $\Delta\phi=0$. Among the various methods which enable the operating point to be moved towards the position $(2K+1)\pi/2$ to work in a sensitive linear zone, the most convenient, as it has been seen, use the sensitivity of the interferometer to the reciprocal variations in phase whose amplitude varies a lot during the transit time in the interferometer.

If $\tau$ is the transit time in the interferometer and a reciprocal phase shift $\phi(t)$ is applied to one end of the ring-shaped optical path, the signal detected becomes:

$$I \propto \cos^2 \frac{(\Delta\phi + \phi(t) - \phi(t-\tau))}{2}$$

If a phase modulator bringing in a reciprocal effect: an elasto-optical or electro-optical one for example, is added in the wave path, the wave phase can be caused to vary periodically. In the present invention, the disturbance $\phi(t)$ will be compound and formed from the sum of two signals, a periodic signal $\phi_1(t)$ of period $2\tau$ and a linear slope $\phi_2(t)$, modulo $2\pi$, in which $\tau$ is the time a wave takes in the ring path.

Hence, $\phi(t)=\phi_1(t)+\phi_2(t)$ in which $\phi_1(t+2\tau)=\phi_1(t)$ and $$\phi_2(t) = \alpha t - 2\pi E\left(\frac{\alpha t}{2\pi}\right) : E\left(\frac{\alpha t}{2\pi}\right)$$

is the integral part of $\alpha t/2\pi$ and $\alpha$ the slope of the sawtooth.

Hence, $$I \propto \cos^2 \frac{(\Delta\phi + \alpha\tau + \phi_1(t) - \phi_1(t-\tau))}{2}$$

If $\Psi(t)=\phi_1(t)-\phi_1(t-\tau)$, because of the periodidity of $\phi(t)$, the function $\Psi(t)$ is symmetrical and $\Psi(t+2\tau)=\Psi(t)+\Psi(t+\tau)=-\Psi(t)$.

Figure 9:
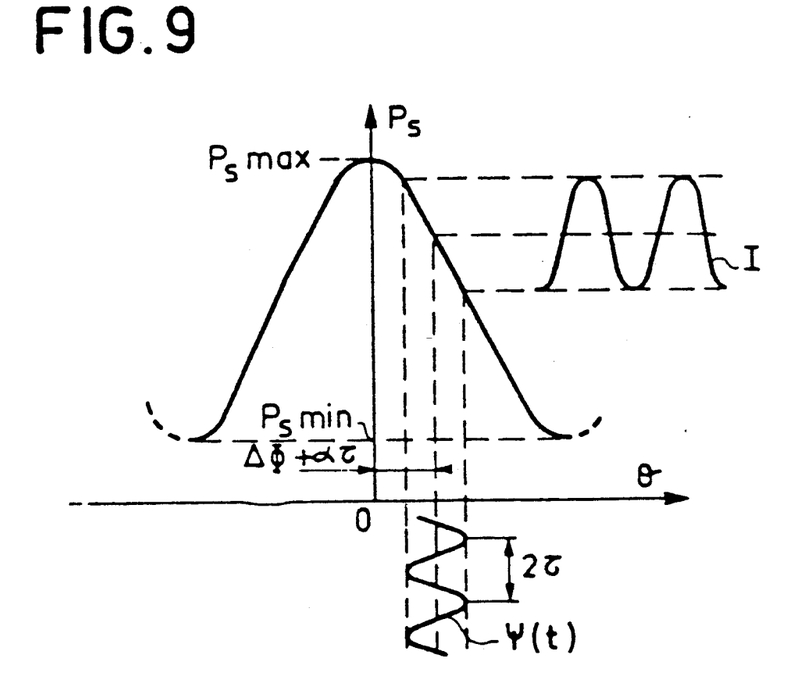
FIGS. 9, 10, 11 and 12 are diagrams explaining the operation of the device in accordance with the invention.

As $\cos^2$ is an even function, the component of signal I of period $2\tau$ in phase with $\phi_1(t)$ is of zero amplitude if, and only if, $\Delta\phi+\alpha\tau=0$. The amplitude of this component is algebraically proportional to the error $\Delta\phi+\alpha\tau$ when the latter is small. If FIG. 9 is considered, a distorted detected signal I corresponds to a signal $\theta=\Delta\phi+\alpha\tau+\Psi(t)$ at the input. It can be broken down into two signals of frequencies $1/\tau$ and $\frac{1}{2}\tau$.

Figure 10:
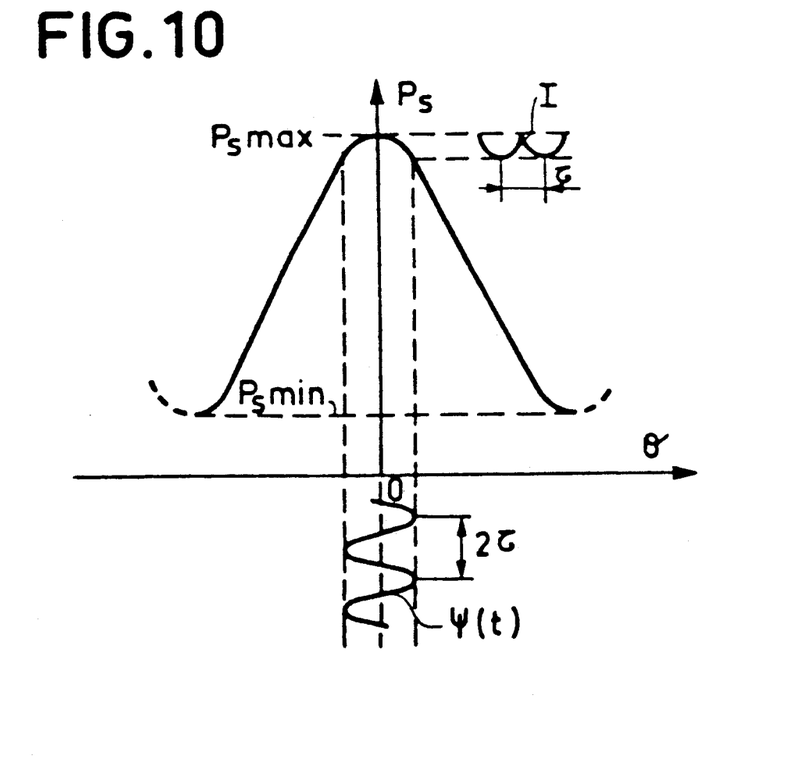

On the other hand, if FIG. 10 is considered, which is different from FIG. 9 in that $\Delta\phi+\alpha\tau=0$, a detected signal I of frequency $1/\tau$ corresponds to an input signal $\theta=\Psi(t)$. The result of the synchronous detection has then a mean value of zero.

In the two FIGS. 9 and 10, the sinusoidal signal $\Psi(t)$ was considered as a non-limiting example.

The amplitude of this component $\Delta\phi+\alpha\tau$ is used as an error signal for servocontrol of coefficient $\alpha$ in the function $\phi_2$. This gives $$\alpha = \frac{\Delta\phi}{\tau}.$$

The relaxation frequency of $\phi_2(t)$ is then $$F(\phi_2) = \frac{\Delta\phi}{2\pi\tau}.$$

This frequency forms the signal measuring the non reciprocal phase shift and the direction in which the relaxation occurs gives the phase shift sign.

Even though the method works no matter what the form and amplitude of the function $\phi_1(t)$, two advantageous forms are:

the sinusoidal function: $\phi_1(t) = 0.81 \sin\left(\frac{\pi}{\tau} t\right)$ the rectangular function: $\phi_1(t) = 0$ if $2K\tau \leq t < (2K+1)\tau$ $\phi_1(t) = \pi/4$ if $(2K+1)\tau \leq t < (2K+2)\tau$ The amplitudes of the two functions have been chosen to give maxima for the signal detected and ensure linearity for small signals.

These two functions are easy to produce; they require a limited pass band and their amplitude corresponds to an advantageous value of the zero method signal to noise ratio.

In the case in FIG. 7, $\phi_1$ is considered as a rectangular function with: $\phi_1(t)$, $\phi_2(t)$, $\phi(t)=\phi_1(t)+\phi_2(t)$. $\phi_{CW}$ and $\phi_{CCW}$ are the phase shifts resulting from each of the two modes which pass through the interferometer loop in opposite directions. These two signals are shifted in phase, one with respect to the other, by $\tau$ due to the reciprocal phase shift, as the modulator is placed at an end of the loop. The quantity $\Delta\phi$, which is the non reciprocal phase shift, also appears. This phase shift in a gyrometer is due to the rotational speed.

$\phi_{CCW}-\phi_{CW}$ is the resultant signal to which the detector is sensitive. The value $\Delta\phi$ of the non reciprocal phase shift reappears with $\alpha\tau$ which was defined previously.

$$\phi_{CCW}-\phi_{CW}=\Delta\phi+\alpha\tau+\Psi(t).$$

$\Psi(t)$ is a symmetrical function and $\Delta\phi+\alpha\tau$ is the mean value of $\phi_{CCW}-\phi_{CW}$.

I is the signal detected. It is obtained as shown in FIG. 10. I is proportional to $\text{Cos}^2(\phi_{CCW}-\phi_{CW})$. If the signal representing $\text{Cos}^2$ is drawn, I is reconstructed when moving from A to B.

The difference in ordinates between points A and B is $2\pi$ because of the amplitude $2\pi$ of the saw-tooth $\phi_2$. As it was said previously, I has been taken as a signal algebraically proportional to $\Delta\phi+\alpha\tau$ and, because of the opposite signs of $\Delta\phi$ and $\alpha\tau$, the amplitude of the signal is proportional to $\alpha\tau-\Delta\phi$.

The relaxation of signal $\phi_2(t)$ must have an amplitude of $2\pi$. In the case in which the scale factor of the corresponding phase modulator is not known or is likely to drift with time; it is advisable to slave this relaxation to $2\pi$.

First of all a comparator is used which makes comparison possible at a voltage Vref corresponding to $2\pi$. When there is equality, a recycling pulse causes the saw-tooth to drop down.

The signals detected at two instants, one preceding the saw-tooth drop (comparison with a voltage Vref) and the other following it (delay line), are also compared. If they are equal, the value Vref is exact because it corresponds to a phase shift of $2\pi$. If this is not so, the value must be changed by $\pm$. The interferometer response remains the same during the transit time of the relaxation discontinuity, which is assumed to be infinitely straight and outside this time.

Figure 12:
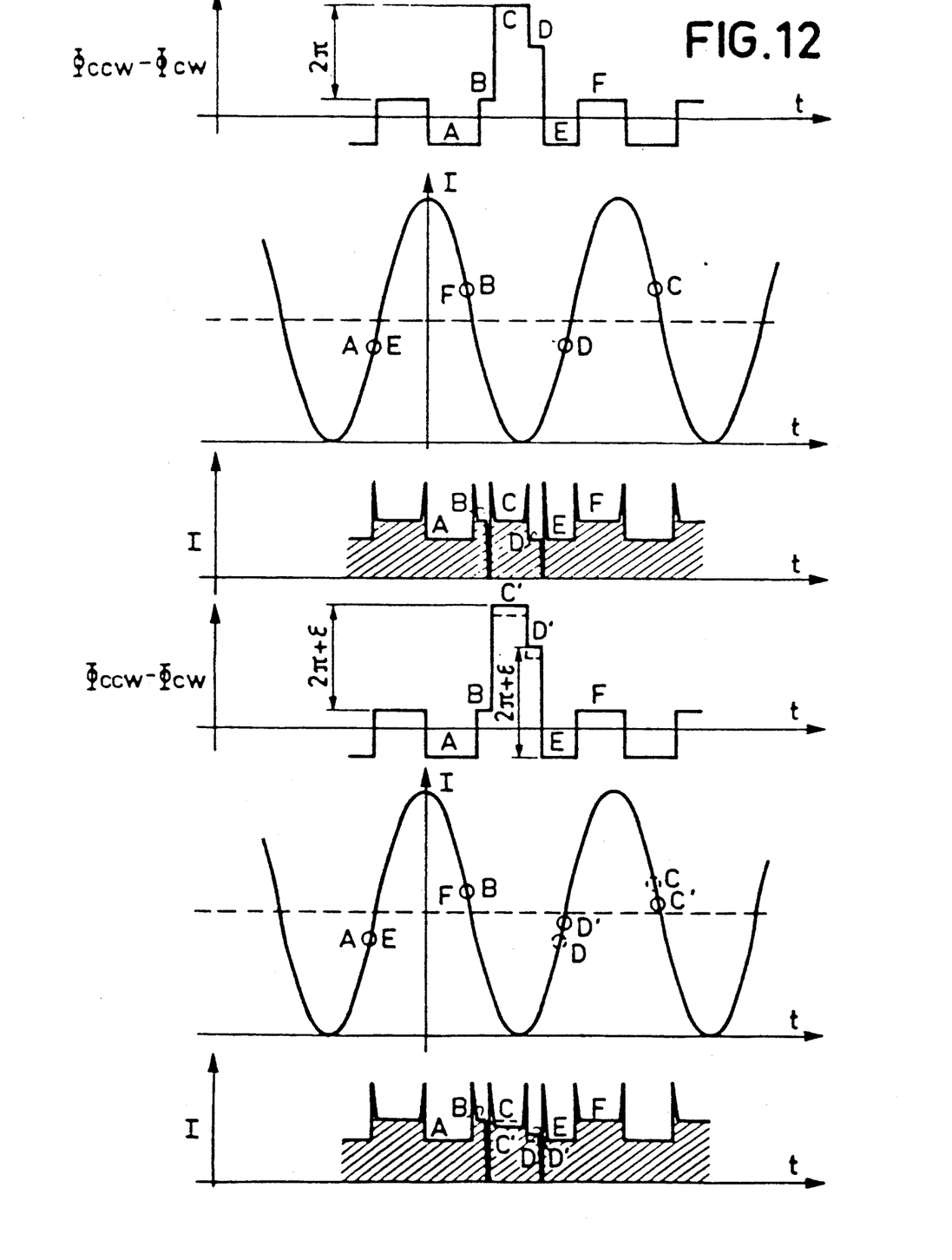
Figure 13:
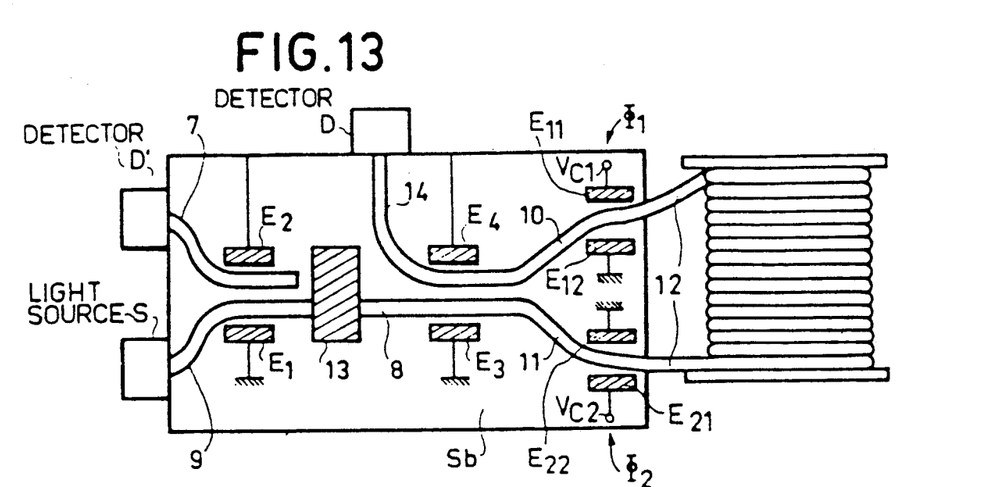
FIGS. 13 and 14 are examples of production of the device using the method in the invention.
Figure 14:
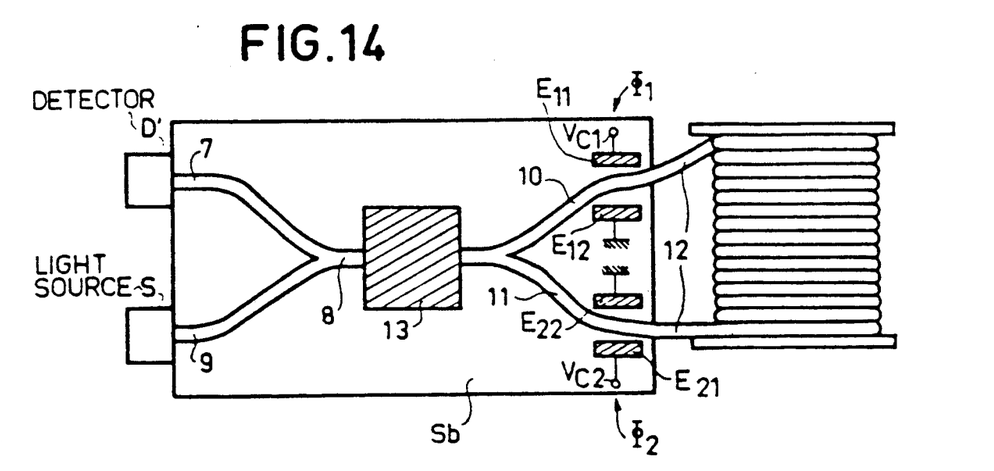

In FIG. 12, the quantity $2\pi$ has become $2\pi+\epsilon$, and points C and D have moved to C' and D' on the curve $I=f(t)$.

The measurement made in accordance with this theory offers the following advantages:

it is stable because it only depends on the precision with which the relaxation is done and on the transit time. There is no phase shift phenomenon.

it is sensitive because it is made near the maximum slope point.

it is linear thanks to the use of the zero method.

it is quantified, which makes transmission and use easy. In particular, integration without drift is obtained by counting only.

The device (a reciprocal phase modulator), which enables the interference $\phi_1(t)+\phi_2(t)$ to be introduced, can, with advantage, be split into two devices placed either one at each end of the path or both at the same end as shown in FIG. 8, one of them giving the phase shift $\phi_1(t)$ and the other $\phi_2(t)$. $\phi_1(t)$ is a signal of small amplitude (typically $\pi/4$), high frequency (typically some 100 kHz) and narrow band ($\simeq 0$) whose precision is not critical. On the other hand, $\phi_2(t)$ is a signal of large amplitude ($2\pi$), low frequency (a few Hz to a few kHz) and wide band (DC to a few kHz) whose precision determines that of the measurement scale factor. These contradictory characteristics are more easily satisfied in two separate devices.

The phase modulator device(s) can each be divided into two identical parts placed symmetrically at the two ends of the optical path and energized in opposition. This arrangement gives additional symmetry to the phenomena which reduces the second order errors resulting from possible non-linearity in the modulators.

It is an advantage in some cases to advance or retard the relaxation instant of function $\phi_2(t)$ to give it a desired fine phase relationship with the functions $\phi_1(t)$. As long as the saw-tooth amplitude remains $2\pi$, no cumulative error is added to the measurement.

When the increment $\Delta\phi dt$ is too big and corresponds to a quantifying of $\int \Delta\phi dt$ which is too coarse, the instantaneous value of $\phi_2(t)$ enables this measurement to be smoothed. The angular increment given by the interferometer being $\frac{1}{2}\pi\tau$ this gives $\int \Delta\phi dt = \Sigma(2\pi\tau)+[\phi_2(t)]$. In particular, in the case in which the relaxation threshold is not reached at any instant during the measurement, the integrated measurement is given continuously and linearly by $\int \alpha\phi dt = [\phi_2(t)]$. Digitalizing is no longer possible but the zero method remains valid.

Figure 11:
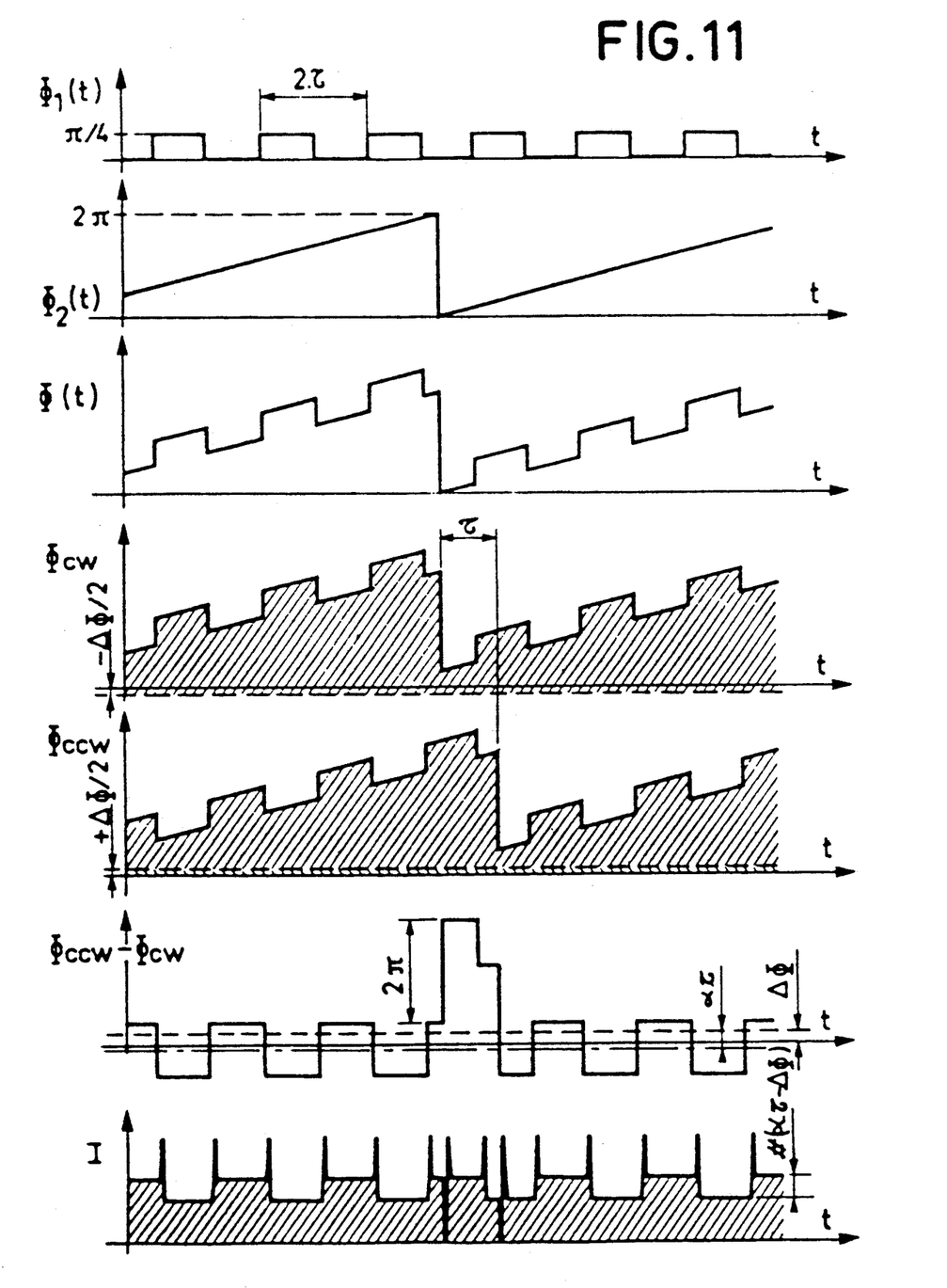

The progress achieved in the production of low loss optical fibres allows the use of optical fibres in the making of these ring-shaped interferometers as it has already been stated. This enables a very long optical path 2, increased miniaturization of the electro-optical elements and of the modulators by integration to be obtained. A way of producing a ring-shaped interferometer complying with the invention is shown in FIG. 11. Fibre 12, wound round itself, forms ring 2 of the interferometer. The various branches of the interferometer are made of integrated optics and the wave-guides are made by integration in a substrate. The substrate may be chosen from the following materials: lithium niobate or tantalate in which titanium or niobium respectively has been diffused to produce the wave-guides. The substrate may also be of gallium arsenide in which the wave-guides have been made by ion or proton implant. The modulator is broken down into two modulators, $\phi_1$ and $\phi_2$, at the two ends of the fibre. More precisely, the modulators used in the invention can take advantage of various known electro-optical effects such as the Pockels effect or the Kerr Effect, to cite non limiting examples.

Two couplers made from pairs of electrodes ($E_1$, $E_2$) and ($E_3$, $E_4$) play the part previously taken by the semi-transparent plates in the figure. Monomode wave-guide 8 acts as the monomode filter in FIG. 1. A polarizer is made by metallizing the substrate surface over wave-guide 8.

The two couplers can be replaced by optical ray separators consisting of monomode wave-guides connected one to another to form Ys, the two Ys being connected one to another by one of their branches. This has been done in FIG. 12. A polarizer has been made by metallizing the substrate surface over wave-guide 8.

The most important application concerns optical fibre gyrometers. In these devices:

$$\Delta\phi = \frac{8\cdot\pi\cdot\vec{N}\cdot\vec{S}\cdot\vec{\Omega}}{C_0\lambda_0}$$

in which $C_0$ = the speed of light in a vacuum, $\lambda_0$ = the light wave-length used in a vacuum,
$\vec{S}$ = the surface taken up by one turn of optical fibre
$\vec{N}$ = the number of turns
$\vec{\Omega}$ = the absolute field of rotation to which the device is subjected.

$$\tau = \frac{N \cdot P \cdot n}{C_0}$$

in which N and $C_0$ are as before P is the perimeter of a turn and n the equivalent index of the fibre used.
This gives $$F_{[\phi 2]} = \frac{\Delta \phi}{2\pi \cdot \tau} = \frac{4 \cdot \vec{S} \cdot \vec{\Omega}}{\lambda_0 \cdot n \cdot P}$$

This frequency is that of the gyro-laser of the same dimensions made of a material with the same index subjected to the same field of rotation.

This result enables an optical fibre gyrometer made in accordance with the present invention ot replace a laser gyrometer without in any way changing the operation of the electronic equipment.

As with the gyro-laser, the gyrometer is converted into a gyroscope by integrating by counting and discounting the output signal, each relaxation corresponding to an increment $\theta_i$ in the absolute angular position of the device:

$$\theta_i = \frac{\lambda_0 \cdot n \cdot P}{4 \cdot S}.$$

In a typical case, the optical fibre gyrometer is made of 400 m of optical fibre with an equivalent index of 1.42 wound on a cylindrical drum, 8 cm in diameter: $S = 5 \cdot 10^{-3}$ cm$^2$, $P = 0.25$ m, $N = 1600$, $\tau = 1.9$ $\mu$sec, $F_{[\phi 2]} = 66$ kHz/(rad/sec) = 0.3 Hz (deg/hr), $\theta_i = 15 \cdot 10^{-6}$ rad = 3 seconds of arc.

Another application is that of optical fibre magnetometers and current probes. These devices use the Faraday effect which, in good polarizing conditions, produces a non reciprocal phase shift $\Delta \phi$ proportional to the magnetic field circulation along the optical fibre: $\Delta \phi \propto \int \vec{B} \cdot d\vec{l}$. The proportionality constant only depends on the material in which the magneto-optical interaction occurs (optical fibre). In the case in which the optical path follows a closed loop in uniform conditions, this circulation is equal to the total electric current passing through this closed circuit: $\Delta \phi \propto \int \vec{B} \cdot d\vec{l} = I$.

If several turns (N) of optical conductor interact with several turns (M) of electrical conductor, these effects are cumulative: $\Delta \phi$ N.M.I and if the present invention is applied to the device:

$$F_{[\phi 2]} \propto \frac{C_0}{2\pi \cdot L \cdot n}.$$

N.M.I in which $C_0$ is the speed of light in a vacuum, L the full length of fibre used and n its equivalent index.

The device thus obtained is a "current/synchro" converter. Integration of the quantity of current is obtained as before by simple counting and discounting, the increment being:

$$Q \propto \frac{2\pi \cdot L \cdot N}{C_0 \cdot N \cdot M}.$$

In a typical case, the proportionality constant (which is deduced from the Verdet constant), for an optical fibre of standard manufacture, is of the order of $10^5$ rad/(A. turn. turn). If the device consists of 100 m of optical fibre with an equivalent index of 1.42:$\tau = 0.5$ $\mu$sec, $F_{[\phi 2]} = 3.5$ Hz (A.turn.turn) and Q = 0.3 C. turn.turn.

Such a device is clearly flexible. For example, it can be used for:

measuring currents of some 10,000 A: 1 turn of fibre round a single conductor: F = 3.5 Hz/A, Q = 0.3 C. An application is in electrolysis baths.

measuring currents of a few Amperes: 100 turns of fibre round 100 turns of electrical conductor: F = 35 kHz/A and Q = 3·10$^{-5}$C.

measuring currents of a few mA: 1000 turns of fibre round 10,000 turns of electrical conductor: F = 35 kHz/mA and Q = 3·10$^{-8}$C.

What is claimed is:

1. An optical interferometer device intended to measure a non reciprocal phase shift undergone by two radiations moving in opposite directions in a ring-shaped wave-guide, the device containing a monochromatic luminous source, means for photodetection of the interference of these radiations, and optical separator and mixer means, which connect the ends of this waveguide directly to the luminous source and photodetector means: said device containing electrically controlled means for giving an optical phase shift $\phi$, which act on these radiations; an oscillator which delivers a periodic voltage of frequency $\frac{1}{2}\tau$, in which $\tau$ is the time taken by each of the radiations to pass through the path determined by the ring; an adjustable slope saw-tooth generator; a synchronous detector, which receives at one of its inputs this periodic voltage and is connected at its other input to the photodetector means; the output of this synchronous detector being connected to the slope control input of the saw-tooth wave generator, the resonant frequency of the saw-tooth being slaved to the non reciprocal phase shift; the periodic and saw-tooth voltages being superimposed at the input to the phase shift means.

2. A device as claimed in claim 1, wherein the phase travel produced by the saw-tooth is roughly equal to $2\pi$.

3. A device as claimed in claim 1, wherein the periodic function modulating the phase of the waves represents rectangular-shaped signals.

4. A device as claimed in claim 1, wherein the periodic function modulating the phase of the waves represents sinusoidal or cosinusoidal signals.

5. A device as claimed in claim 1, wherein the oscillator delivering the periodic voltage and the saw-tooth generator use an electro-optical effect.

6. A device as claimed in claim 1, containing filtering means which enable a particular mode to be selected from among the modes likely to propagate in the loop and reach the detection device.

7. A device as claimed in claim 6, wherein the filtering means contain a mode filter and a polarizer which only transmits a single mode.

8. A device as claimed in claim 1 for an interferometer whose ring is formed by an optical fibre and the energy source, the wave separation and mixing means and detection means are produced in a solid medium by integration on a substrate on which have been produced two wave-guides, coupled and joined at one of their ends to the energy source and two detection means respectively and at their other ends to the ends of the optical fibre; said device containing integrated in the substrate, at least one pair of electrodes, arranged on one side and on the other of the two wave-guides to form an electro-optical effect phase modulator, the electrodes receiving the control signal.

9. A device as claimed in claim 8, wherein the wave separation and mixing means are produced by integration of wave-guides on a substrate, these wave-guides being in the shape of two Ys connected one to the other by one of their branches.

10. A device as claimed in claim 9, wherein the substrate is chosen from among the following materials: lithium niobate or tantalate in which titanium or niobium respectively has been diffused to produce the wave-guides.

11. A device as claimed in claim 9, wherein the substrate is of gallium arsenide in which the wave-guides have been made by ion or proton implant.

12. A gyrometer, containing a ring-shaped interferometer device as described in claim 1.

13. A current measurement device, containing a ring-shaped interferometer device as described in claim 1.

* * * * *